United States Patent Office 3,331,875
Patented July 18, 1967

3,331,875
MANUFACTURE OF ENAMINES
Thomas H. Strickland, Kingsport, Tenn., assignor to Eastman Kodak Company, Rochester, N.Y., a corporation of New Jersey
No Drawing. Filed Apr. 15, 1964, Ser. No. 360,110
15 Claims. (Cl. 260—563)

This invention relates to a novel chemical process and more particularly to a novel process for the preparation of enamines from carbonyl compounds and low-boiling secondary amines.

The existing processes for the production of enamines from carbonyl compounds and secondary amines either require the use of a solid condensing agent or are not suitable for low-boiling secondary amines such as dimethylamine or diethylamine.

I have discovered a novel process for preparing enamines from low boiling secondary amines in the absence of drying agents. The enamine product from the process of my invention can be readily recovered, e.g., by fractional distillation, without filtration, which is required when a drying agent is employed. Furthermore, the process of my invention is adaptable for continuous operation which is important in the commercial production of enamines.

The chemical reaction taking place during the process of my invention can be represented by the following equation:

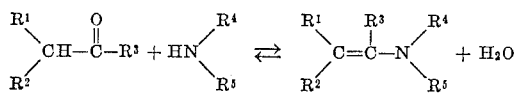

In the formulae, in the preceding equation, $R^1$, when taken singly is lower alkyl, e.g., alkyl of 1 to about 4 carbon atoms, or phenyl. The substituent $R^2$, when taken singly, is hydrogen or lower alkyl and $R^3$, when taken singly is hydrogen. The substitutents $R^4$ and $R^5$ can be methyl or ethyl. When $R^1$ and $R^2$ are taken collectively with the carbon atoms to which they are attached, they can represent a saturated carbocyclic ring of 4 to 7 ring carbon atoms and $R^1$ and $R^3$, when taken collectively with the carbon atoms to which they are attached, represent a saturated carbocyclic ring of 4 to 7 ring carbon atoms.

Examples of the carbonyl compounds useful in the course of my invention are aldehydes such as propionaldehyde; butyraldehyde; pentaldehyde; hexaldehyde; isobutyraldehyde; 2-methylbutyraldehyde; 2-ethylbutyraldehyde; 2-ethylpentaldehyde; 2-propylpentaldehyde; 2-propylhexaldehyde; 2-butylhexaldehyde; phenylacetaldehyde; cyclobutanecarboxaldehyde; cyclopentanecarboxaldehyde; cyclohexanecarboxaldehyde; cycloheptanecarboxaldehyde; etc. and cyclic ketones such as cyclobutanone; cyclopentanone; cyclohexanone; cycloheptanone; etc.

The low-boiling secondary amines to which the process of my invention is applicable are dimethylamine; ethylmethylamine; and diethylamine.

The process of my invention is carried out by contacting the carbonyl compound and the secondary amine at reaction temperature and continuously removing the water of reaction from admixture with the enamine product by carrying out the reaction in the presence of a liquid extractive solvent in which water is substantially insoluble and in which the enamine product is preferentially soluble. If the combined vapor pressures of the liquid extractive solvent phase and the water of reaction at reaction temperatures are equal to the pressure imposed upon the system, e.g., atmospheric pressure, the water of reaction is removed from admixture with the enamine product as a vapor whereas, if the combined vapor pressures are less than the pressure imposed upon the system, the water of reaction is removed from admixture with the enamine product as a separate liquid phase. In either event, the water of reaction is continuously removed from admixture with the enamine product as a separate and distinct phase as a result of the insolubility of the water in the liquid extractive solvent and because of the preferential solubility of the enamine product in the liquid extractive solvent.

Suitable extractive solvents include acyclic hydrocarbons such as pentane; hexane; heptane; 2-methylpentane; 3-methylpentane; 2,2 - dimethylbutane; 2,3-dimethylbutane; 2-methylhexane; 3-methylhexane; 3-ethylpentane; 2, 2-dimethylpentane; 2,3 - dimethylpentane; 2,4-dimethylpentane; 3,3-dimethylpentane; 2,2,3-trimethylbutane, etc., or cyclic hydrocarbons such as xylene, decahydronaphthalene, etc.

Preferred solvents are xylene; either ortho, meta or para; n-hexane or n-pentane.

The process of my invention can be carried out at a temperature between the freezing point of water and the boiling point of the solvent provided the extractive solvent exhibits the previously discussed desired properties at the selected temperature. The reaction can be carried out at subatmospheric or superatmospheric pressures. However, for reasons of convenience, it is preferred to operate the process at atmospheric pressure. The process of my invention is preferably carried out at temperature in excess of the boiling point of the secondary amine and below about 85° C.

If it is desired to separate the water of reaction from admixture with the enamine product as a vapor, the liquid extractive solvent must exert sufficient vapor pressure at the chosen reaction temperature to insure that the water of reaction is rapidly vaporized as soon as it is formed. In general, those of the previously listed solvents having boiling points below about 80° C. are useful in this modification of my process. In a preferred embodiment of this modification of my process, the vapors removed are condensed, collected and the extractive solvent decanted and returned to the reaction zone.

The carbonyl compound and the secondary amine react in equimolar proportions. Accordingly, equimolar amounts of the reactants are generally employed. However, an excess of either the carbonyl compound or the secondary amine is not detrimental to the process of the invention and may, in some instances, be preferred.

The amount of solvent employed is generally determined by the size of the equipment in which the process of the invention is carried out. In any event, there must be enough solvent present to dissolve the reactants and the enamine product.

The following examples illustrate the process of my invention.

*Example 1*

A mixture of 160 g. of butyraldehyde (2.2 moles) and 750 cc. pentane was placed in a 1 liter jacketed decanter and cooled to 15° C. One hundred grams of dimethylamine (2.2 moles) was added over a period of 8 hours. The reaction mixture was allowed to stand overnight at 15° C. The organic layer was decanted from the water layer and distilled through a packed column under reduced pressure. One hundred and ten grams (50%) of N,N-dimethyl-1-butenylamine was obtained. B.P. 55–63° C./150 mm. $n_D^{20}$ 1.4386.

*Example 2*

A mixture of 80 g. isobutyraldehyde (1.1 moles) and 73 g. diethylamine (1.0 mole) was placed in a 500 cc. flask fitted with a distillation column, a Dean Stark trap previously filled with hexane, and an ice water condenser. The reaction mixture was heated at slow reflux until water no longer was collected in the Dean Stark trap. Distillation through a packed column gave, after removal of hexane and unreacted starting material, 96 g. (75%) of N,N-diethyl isobutenylamine. B.P. 122–124° C., $n_D^{20}$ 1.4260.

Example 3

A mixture of 80 g. isobutyraldehyde (1.1 moles) and 100 cc. n-hexane was placed in a 500 cc. flask equipped as described in Example 2. The mixture was heated to slow reflux and gaseous dimethylamine added below the surface of the liquid at a rate of 5 g. per hour. After a total of 39.5 g. (0.87 mole) had been added, the reaction mixture was allowed to reflux an additional 3 hours. The reaction mixture was distilled to give, after removal of the hexane and unreacted starting materials, 75 g. (86%) of N,N-dimethylisobutenylamine. B.P. 84–87° C., $n_D^{20}$ 1.4219.

Example 4

A continuous reactor was fabricated from a 100 cc. 3-neck flask as follows: one neck was used for the continuous introduction of reactants into the reactor, the center neck was fitted with a Dry Ice-acetone condenser vented to the atmosphere and the third neck was adapted for the continuous removal of the organic phase within the reactor. The bottom of the flask was equipped with an outlet for the removal of water. The reaction temperature was maintained by means of a constant temperature water bath.

The temperature of the water bath was adjusted to 80° C. A mixture of 15 g. dimethylamine (0.3 mole), 36 g. isobutyraldehyde (0.5 mole) and 50 g. xylene was introduced into the reactor at the rate of 30 g. per hour. A constant liquid level was maintained in the reactor by continuous withdrawal of the organic phase and by removal of water through the outlet in the bottom of the reactor. After all of the feed mixture had been added, the reactor was purged by the addition of 100 cc. of xylene at the rate of 30 g. per hour. The organic phase removed from the reactor was distilled to yield 30 g. (91%) of N,N-dimethylisobutenylamine. B.P. 84–87° C.

Example 5

A mixture of 128 g. 2-ethylhexanal (1.0 mole) and 700 cc. pentane was placed in a 1 liter jacketed decanter and cooled to 15° C. Forty-five g. dimethylamine (1.0 mole) was added over a period of one hour. The organic layer was decanted from the water layer and distilled through a packed column under reduced pressure. After removal of solvent and starting material, 63 g. (40%) of N,N-dimethyl-1-(2-ethyl)hexenyl amine was obtained. B.P. 104–108° C./100 mm. $n_D^{20}$ 1.4395.

Example 6

A mixture of 60 g. phenylacetaldehyde (0.5 mole) and 400 cc. pentane was placed in a jacketed decanter and cooled to 15° C. Twenty-three g. dimethylamine (0.5 mole) was added over a period of 8 hours. The reaction mixture was allowed to stand overnight at 15° C. The organic layer was decanted from the water layer and distilled through a packed column under reduced pressure. After removal of solvent and starting material, 48 g. (65%) N,N-dimethylstyrylamine was obtained. B.P. 82–87° C./1.5–2.5 mm. $n_D^{20}$ 1.6018.

Example 7

A mixture of 56 g. cyclohexanecarboxaldehyde (0.5 mole) and 400 cc. of pentane was placed in a jacketed decanter and cooled to 15° C. Twenty-three g. dimethylamine (0.5 mole) was added over a period of 8 hours. The reaction mixture was allowed to stand overnight at 15° C. The organic layer was decanted from the water layer and distilled through a packed column under reduced pressure. After removal of solvent and starting material, 43 g. (62%) N-cyclohexylidenemethyl)dimethylamine was obtained. B.P. 171–172.5° C. $n_D^{20}$ 1.4747.

Example 8

Seven hundred cc. pentane was placed on a 1 liter jacketed decanter, cooled to 10° C. and 100 g. dimethylamine (2.2 moles) slowly added. To this solution, 168 g. cyclopentanone (2.0 moles) was added at a rate of 10 g. per hour. The reaction mixture was allowed to stand at 10° C. overnight. The organic layer was decanted from the water layer and distilled through a packed column under reduced pressure. After removal of solvent and starting material, 51 g. (23%) of N,N-dimethylcyclopentenylamine was obtained. B.P. 69° C./30 mm. $n_D^{20}$ 1.4808.

Example 9

Seven hundred cc. pentane was placed in a 1 liter jacketed decanter, cooled to 10° C., and 100 g. dimethylamine (2.2 moles) slowly added. To this solution, 100 g. cyclohexanone (1.02 moles) was added at a rate of 10 cc. per hour. The reaction mixture was allowed to stand at 10° C. overnight. The organic layer was decanted from the water layer and distilled through a packed column under reduced pressure. After removal of solvent and starting material, 44 g. (35%) of N,N-dimethylcyclohexenylamine was obtained. B.P. 89–90° C./50 mm.

The invention has been described in considerable detail with particular reference to certain preferred embodiments thereof, but it will be understood that variations and modifications can be effected within the spirit and scope of the invention as described hereinbefore and as defined in the appended claims.

The embodiments of the invention in which an exclusive property or privilege is claimed are defined as follows:

1. A process for preparing an enamine of the formula:

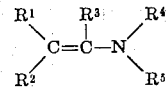

which comprises contacting a carbonyl compound of the formula:

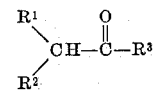

with a secondary amine of the formula:

and continuously removing the water of reaction from admixture with the enamine product by carrying out the reaction in the presence of a liquid hydrocarbon extractive solvent in which water is substantially insoluble at reaction temperature and in which the enamine product is preferentially soluble at reaction temperature; wherein $R^1$, when taken singly, is selected from the group consisting of:
    (a) lower alkyl and
    (b) phenyl;

$R^2$, when taken singly, is selected from the group consisting of:
    (a) hydrogen and
    (b) lower alkyl;

$R^3$, when taken singly, is hydrogen;

$R^4$ and $R^5$ are selected from the group consisting of:
    (a) methyl and
    (b) ethyl;

$R^1$ and $R^2$, when taken collectively with the carbon atoms to which they are attached, represent a saturated carbocyclic ring of 4 to 7 ring carbon atoms; and $R^1$ and $R^3$, when taken collectively with the carbon atom to which they are attached, represent a saturated carbocyclic ring of 4 to 7 ring carbon atoms.

2. The process of claim 1 in which the solvent is selected from the group of pentane; hexane; 2-methylpentane; 3-methylpentane; 2,2-dimethylbutane; 2,3-dimethylbutane; 2-methylhexane; 3-methylhexane; 3-ethylpentane; 2,2-dimethylpentane; 2,3-dimethylpentane; 2,4-dimethylpentane; 3,3 - dimethylpentane; 2,2,3 - trimethylbutane, xylene and decahydronaphthalene.

3. A process for preparing an enamine of the formula:

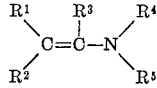

which comprises contacting a carbonyl compound of the formula:

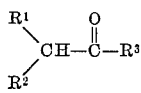

with a secondary amine of the formula:

and continuously removing the water of reaction from admixture with the enamine product by carrying out the reaction in the presence of a liquid extractive solvent selected from the group consisting of: (1) n-pentane, (2) n-hexane and (3) xylene; wherein $R^1$, when taken singly, is selected from the group consisting of:
 (a) lower alkyl and
 (b) phenyl;

$R^2$, when taken singly, is selected from the group consisting of:
 (a) hydrogen and
 (b) lower alkyl;

$R^3$, when taken singly, is hydrogen;

$R^4$ and $R^5$ are selected from the group consisting of
 (a) methyl and
 (b) ethyl;

$R^1$ and $R^2$, when taken collectively with the carbon atom to which they are attached, represent a saturated carbocyclic ring of 4 to 7 ring carbon atoms; and $R^1$ and $R^3$, when taken collectively with the carbon atom to which they are attached, represent a saturated carbocyclic ring of 4 to 7 ring carbon atoms.

4. The process of claim 3 in which the reaction temperature is above the boiling point of the secondary amine and below the boiling point of the liquid extractive solvent.

5. The process of claim 3 in which the reaction temperature is above the boiling point of the secondary amine and below about 85° C.

6. The process of claim 3 in which the vapor pressure of the extractive solvent at reaction temperature is sufficiently high that the water of reaction is continuously removed as a vapor from admixture with the enamine product.

7. The process of claim 6 in which the reaction temperature is above the boiling point of dimethylamine and below about 85° C.

8. The process for preparing N,N-dimethylisobutenylamine which comprises contacting isobutyraldehyde and dimethylamine and continuously removing the water of reaction from admixture with the enamine by carrying out the reaction in the presence of an extractive solvent selected from the group consisting of:
 (a) n-pentane,
 (b) n-hexane and
 (c) xylene
at a temperature above the boiling point of dimethylamine and below the boiling point of the solvent.

9. The process for preparing N,N-diethylisobutenylamine which comprises contacting isobutyraldehyde with diethylamine and continuously removing the water of reaction from admixture with the enamine by carrying out the reaction in the presence of n-hexane at a temperature above the boiling point of diethylamine and below the boiling point of n-hexane.

10. The process for preparing N,N-dimethylbutenylamine which comprises contacting butyraldehyde with dimethylamine and continuously removing the water of reaction from admixture with the enamine by carrying out the reaction in the presence of n-pentane at a temperature above the boiling point of dimethylamine and below the boiling point of n-pentane.

11. The process for preparing N,N-dimethyl-1-(2-ethyl)hexenylamine which comprises contacting 2-ethylhexanal with dimethylamine and continuously removing the water of reaction from admixture with the enamine by carrying out the reaction in the presence of n-pentane at a temperature above the boiling point of dimethylamine and below the boiling point of n-pentane.

12. The process for preparing N,N-dimethylstyrylamine which comprises contacting phenylacetaldehyde with dimethylamine and continuously removing the water of reaction from admixture with the enamine by carrying out the reaction in the presence of n-pentane at a temperature above the boiling point of dimethylamine and below the boiling point of n-pentane.

13. The process for preparing N-(cyclohexylidenemethyl)dimethylamine which comprises contacting cyclohexanecarboxaldehyde with dimethylamine and continuously removing the water of reaction from admixture with the enamine by carrying out the reaction in the presence of n-pentane at a temperature above the boiling point of dimethylamine and below the boiling point of n-pentane.

14. The process for preparing N,N-dimethylcyclopentenylamine which comprises contacting cyclopentanone with dimethylamine and continuously removing the water of reaction from admixture with the enamine by carrying out the reaction in the presence of n-pentane at a temperature above the boiling point of dimethylamine and below the boiling point of n-pentane.

15. The process for preparing N,N-dimethylcyclohexenylamine which comprises contacting cyclohexanone with dimethylamine and continuously removing the water of reaction from admixture with the enamine by carrying out the reaction in the presence of n-pentane at a temperature above the boiling point of dimethylamine and below the boiling point of n-pentane.

No references cited.

CHARLES B. PARKER, Primary Examiner.

N. WICZER, Assistant Examiner.